United States Patent
Ito et al.

(10) Patent No.: US 12,253,601 B2
(45) Date of Patent: Mar. 18, 2025

(54) THREE-DIMENSIONAL SURVEY APPARATUS, THREE-DIMENSIONAL SURVEY METHOD, AND THREE-DIMENSIONAL SURVEY PROGRAM

(71) Applicant: Topcon Corporation, Tokyo (JP)

(72) Inventors: Tadayuki Ito, Tokyo (JP); Yoshihiro Nishi, Tokyo (JP); Motohiro Miyajima, Tokyo (JP)

(73) Assignee: Topcon Corporation, Tokyo (JP)

( * ) Notice: Subject to any disclaimer, the term of this patent is extended or adjusted under 35 U.S.C. 154(b) by 745 days.

(21) Appl. No.: 17/017,719

(22) Filed: Sep. 11, 2020

(65) Prior Publication Data
US 2021/0080577 A1     Mar. 18, 2021

(30) Foreign Application Priority Data
Sep. 13, 2019   (JP) .................. 2019-167413

(51) Int. Cl.
*G01S 17/42*     (2006.01)
*G01S 7/481*     (2006.01)
*G01S 17/89*     (2020.01)

(52) U.S. Cl.
CPC ............ *G01S 17/42* (2013.01); *G01S 7/4817* (2013.01); *G01S 17/89* (2013.01)

(58) Field of Classification Search
CPC ..... G01C 15/002; G01S 17/89; G01S 7/4817; G01S 17/42
See application file for complete search history.

(56) References Cited

U.S. PATENT DOCUMENTS 7,764,809 B2   7/2010  Ohtomo et al.
11,143,505 B2  10/2021 Kumagai et al.
(Continued)

FOREIGN PATENT DOCUMENTS

EP   3258212 A1   12/2017
EP   3489625 A1    5/2019
(Continued)

OTHER PUBLICATIONS

MacKinnon et al., "Adaptive laser range scanning," 2008 American Control Conference, Seattle, WA, USA, 2008, pp. 3857-3862 (Year: 2008).*

(Continued)

*Primary Examiner* — Yuqing Xiao
*Assistant Examiner* — Zhengqing Qi
(74) *Attorney, Agent, or Firm* — Chiesa Shahinian & Giantomasi PC

(57) ABSTRACT

A three-dimensional survey apparatus includes a collimating ranging unit, a scanner unit, and a control calculation portion. The control calculation portion executes control to acquire, based on a survey result of the collimating ranging unit, three-dimensional data related to a characteristic portion of the measurement object which is present between a plurality of pieces of three-dimensional data that are included in point cloud data having been acquired by the scanner unit and of which the three-dimensional data has not been acquired by the scanner unit, and to add the three-dimensional data related to the characteristic portion of the measurement object having been acquired based on a survey result of the collimating ranging unit to the point cloud data having been acquired by the scanner unit.

7 Claims, 6 Drawing Sheets

(56) References Cited

U.S. PATENT DOCUMENTS

| | | | |
|---|---|---|---|
| 2005/0195384 A1 | 9/2005 | Ohtomo et al. | |
| 2014/0268093 A1* | 9/2014 | Tohme | G01S 17/48 356/3.08 |
| 2014/0298666 A1* | 10/2014 | Zogg | G01B 11/27 33/286 |
| 2017/0363421 A1 | 12/2017 | Kumagai et al. | |
| 2019/0162853 A1 | 5/2019 | Kumagai et al. | |
| 2019/0383913 A1* | 12/2019 | Crouch | G01S 7/4817 |
| 2020/0018852 A1* | 1/2020 | Walls | G01S 7/4972 |

FOREIGN PATENT DOCUMENTS

| | | | |
|---|---|---|---|
| JP | 2005249715 A | | 9/2005 |
| JP | 2006162444 A | | 6/2006 |
| JP | 2017009557 A | | 1/2017 |
| JP | 2017167092 A | * | 9/2017 |
| JP | 6234169 B2 | | 11/2017 |
| JP | 2017223540 A | | 12/2017 |
| JP | 2019095371 A | | 6/2019 |

OTHER PUBLICATIONS

Machine translation for JP-2017167092-A (Year: 2017).*
Extended European Search Report mailed Feb. 18, 2021, in connection with European Patent Application No. 20195609.1, 8 pgs.
Notice of Reasons for Refusal mailed May 11, 2023 in connection with Japanese Patent Application No. 2019-167413, 8 pgs. (including translation).

* cited by examiner

THREE-DIMENSIONAL SURVEY APPARATUS, THREE-DIMENSIONAL SURVEY METHOD, AND THREE-DIMENSIONAL SURVEY PROGRAM

CROSS-REFERENCE TO RELATED APPLICATIONS

This application claims priority to Japanese Patent Application No. 2019-167413, filed Sep. 13, 2019, the disclosure of which is incorporated herein by reference in its entirety.

TECHNICAL FIELD

The present invention relates to a three-dimensional survey apparatus, a three-dimensional survey method, and a three-dimensional survey program.

BACKGROUND

Japanese Patent Application Laid-open No. 2017-223540 discloses a survey system provided with a total station and a laser scanner unit. The total station is a survey apparatus that measures three-dimensional coordinates (three-dimensional data) of a measurement point with high accuracy. The laser scanner unit rotatingly emits pulse laser light as ranging light and performs ranging for each pulse of pulse laser light to acquire point cloud data. More specifically, the laser scanner unit irradiates a measurement object with pulse laser light as ranging light and receives reflected light of each portion of the pulse laser light having been reflected by the measurement object, and by measuring a distance to the measurement object and detecting an emission direction (a horizontal angle and a vertical angle) of the ranging light, the laser scanner unit acquires three-dimensional data (three-dimensional point cloud data) of a large number of points of the measurement object.

Measurement accuracy of a total station including industrial measurement is extremely high. For example, when used in the field of survey, a total station can ensure measurement accuracy of 1 mm or less with respect to distance accuracy and, at the same time, a total station can ensure sufficient accuracy that is required by a class I theodolite and the like with respect to angle accuracy. The laser scanner unit is capable of executing a point group measurement of several hundreds of thousands of points per second and a highly-efficient survey can be realized at an extremely high speed.

In this case, the laser scanner unit rotates and irradiates pulse laser light in a direction of a predetermined angle and performs ranging for each pulse of pulse laser light to acquire point cloud data. Therefore, the point cloud data acquired by the laser scanner unit has a grid structure. In other words, a plurality of pieces of three-dimensional data that are included in the point cloud data having been acquired by the laser scanner unit are pieces of three-dimensional data related to portions which are separated from one another in the measurement object and which are positioned in, for example, a grid pattern. Therefore, a characteristic portion such as a corner portion or an edge portion of the measurement object for which acquisition of three-dimensional data was originally desired may be present between a plurality of pieces of three-dimensional data that are included in the point cloud data having been acquired by the laser scanner unit and may not be acquired by the laser scanner unit. In this regard, a three-dimensional survey apparatus equipped with a laser scanner unit has room for improvement.

SUMMARY

The present invention has been made in order to solve the problem described above and an object thereof is to provide a three-dimensional survey apparatus, a three-dimensional survey method, and a three-dimensional survey program which are capable of more reliably acquiring three-dimensional data related to a characteristic portion of a measurement object.

The problem described above is solved by a three-dimensional survey apparatus according to the present invention which acquires three-dimensional data of a measurement object, the three-dimensional survey apparatus including: a collimating ranging unit which irradiates the measurement object with first ranging light by collimation of a telescope portion and which, based on first reflected ranging light that is reflection of the first ranging light by the measurement object, measures a distance to the measurement object and detects a direction of the collimation; a scanner unit which is integrally provided with the collimating ranging unit and rotatingly emits second ranging light and which, based on second reflected ranging light that is reflection of the second ranging light by the measurement object, measures a distance to the measurement object and detects an emission direction of the second ranging light to acquire point cloud data related to the measurement object; and a control calculation portion which is provided in at least one of the collimating ranging unit and the scanner unit, wherein the control calculation portion executes control to acquire, based on a survey result of the collimating ranging unit, the three-dimensional data related to a characteristic portion of the measurement object which is present between a plurality of pieces of the three-dimensional data that are included in the point cloud data and of which the three-dimensional data has not been acquired by the scanner unit, and to add the three-dimensional data related to the characteristic portion having been acquired based on the survey result of the collimating ranging unit to the point cloud data.

With the three-dimensional survey apparatus according to the present invention, the control calculation portion acquires, based on a survey result of the collimating ranging unit, three-dimensional data related to a characteristic portion of the measurement object which is present between a plurality of pieces of the three-dimensional data that are included in the point cloud data having been acquired by the scanner unit. The characteristic portion of the measurement object, as referred to herein, is a portion of the measurement object which is a corner portion, an edge portion, or the like of the measurement object for which acquisition of three-dimensional data was originally desired and of which the three-dimensional data has not been acquired by the scanner unit. In addition, the control calculation portion executes control to add the three-dimensional data related to the characteristic portion of the measurement object having been acquired based on the survey result of the collimating ranging unit to the point cloud data having been acquired by the scanner unit. In other words, the control calculation portion executes control to synthesize the three-dimensional data related to the characteristic portion of the measurement object having been acquired based on the survey result of the collimating ranging unit and the point cloud data having been acquired by the scanner unit. Accordingly, the three-dimensional survey apparatus according to the present invention can more reliably acquire the three-dimensional data related to the characteristic portion of the measurement object.

In the three-dimensional survey apparatus according to the present invention, preferably, the control calculation portion directly acquires the three-dimensional data related to the characteristic portion having been set at a measurement location by the collimation of the telescope portion with the collimating ranging unit.

With the three-dimensional survey apparatus according to the present invention, the control calculation portion performs, with the collimating ranging unit, a survey (ranging and angle measurement) of the characteristic portion set at a measurement location by the collimation of the telescope portion of the collimating ranging unit to directly acquire the three-dimensional data related to the characteristic portion of the measurement object. Accordingly, the control calculation portion can directly acquire the three-dimensional data related to the characteristic portion of the measurement object with the collimating ranging unit and more reliably add the three-dimensional data related to the characteristic portion having been directly acquired by the collimating ranging unit to the point cloud data having been acquired by the scanner unit.

In the three-dimensional survey apparatus according to the present invention, preferably, the control calculation portion calculates a geometric surface in a vicinity of the characteristic portion based on the point cloud data in the vicinity of the characteristic portion, acquires a direction of the collimation of the telescope portion with respect to the characteristic portion with the collimating ranging unit, and acquires the three-dimensional data related to the characteristic portion based on the geometric surface and the direction of the collimation of the telescope portion.

With the three-dimensional survey apparatus according to the present invention, even when the characteristic portion of the measurement object such as a corner portion or an edge portion of the measurement object is a portion of which the three-dimensional data is difficult to acquire with the collimating ranging unit, the control calculation portion can more reliably acquire the three-dimensional data related to the characteristic portion based on the geometric surface in the vicinity of the characteristic portion and the direction of the collimation of the telescope portion. Specifically, depending on a shape of the characteristic portion or the direction of the collimation of the telescope portion, low intensity of reflected ranging light or a virtual absence of reflected ranging light may prevent the collimating ranging unit from ranging the characteristic portion of the measurement object and prevent the three-dimensional data related to the characteristic portion from being acquired. On the other hand, even when the collimating ranging unit is unable to range the characteristic portion of the measurement object, the collimating ranging unit can reliably detect the direction of the collimation of the telescope portion and reliably perform angle measurement of the characteristic portion of the measurement object. Therefore, by calculating a geometric surface in the vicinity of the characteristic portion of the measurement object based on the point cloud data in the vicinity of the characteristic portion, acquiring the direction of the collimation of the telescope portion with respect to the characteristic portion of the measurement object with the collimating ranging unit, and applying the direction of the collimation of the telescope portion having been detected by the collimating ranging unit with respect to the geometric surface in the vicinity of the characteristic portion, the control calculation portion can more reliably acquire the three-dimensional data related to the characteristic portion. Accordingly, the control calculation portion can more reliably add the three-dimensional data related to the characteristic portion of the measurement object to the point cloud data having been acquired by the scanner unit.

In the three-dimensional survey apparatus according to the present invention, preferably, the control calculation portion recognizes the characteristic portion based on the point cloud data in the vicinity of the characteristic portion and automatically sets a region including the recognized characteristic portion at a measurement location, and acquires the three-dimensional data related to the characteristic portion by having the collimating ranging unit execute an automatic scan at the measurement location.

With the three-dimensional survey apparatus according to the present invention, even if a worker or the like does not set a measurement location to be automatically scanned by the collimating ranging unit using an operation display portion or the like, the control calculation portion recognizes the characteristic portion of the measurement object based on the point cloud data in the vicinity of the characteristic portion of the measurement location and automatically sets the measurement location to be automatically scanned by the collimating ranging unit. Accordingly, the control calculation portion can efficiently acquire the three-dimensional data related to the characteristic portion of the measurement object with the collimating ranging unit and efficiently add the three-dimensional data related to the characteristic portion of the measurement object to the point cloud data having been acquired by the scanner unit.

The problem described above is solved by a three-dimensional survey method according to the present invention which is executed by a three-dimensional survey apparatus that acquires three-dimensional data of a measurement object, the three-dimensional survey apparatus including: a collimating ranging unit which irradiates the measurement object with first ranging light by collimation of a telescope portion and which, based on first reflected ranging light that is reflection of the first ranging light by the measurement object, measures a distance to the measurement object and detects a direction of the collimation; a scanner unit which is integrally provided with the collimating ranging unit and rotatingly emits second ranging light and which, based on second reflected ranging light that is reflection of the second ranging light by the measurement object, measures a distance to the measurement object and detects an emission direction of the second ranging light to acquire point cloud data related to the measurement object; and a control calculation portion which is provided in at least one of the collimating ranging unit and the scanner unit, wherein the three-dimensional survey method includes the step of: acquiring, based on a survey result of the collimating ranging unit, the three-dimensional data related to a characteristic portion of the measurement object which is present between a plurality of pieces of the three-dimensional data that are included in the point cloud data and of which the three-dimensional data has not been acquired by the scanner unit, and adding the three-dimensional data related to the characteristic portion having been acquired based on the survey result of the collimating ranging unit to the point cloud data.

With the three-dimensional survey method according to the present invention, three-dimensional data related to a characteristic portion of the measurement object which is present between a plurality of pieces of the three-dimensional data that are included in the point cloud data having been acquired by the scanner unit is acquired based on a survey result of the collimating ranging unit. The characteristic portion of the measurement object, as referred to herein, is a portion of the measurement object which is a corner portion, an edge portion, or the like of the measurement object for which acquisition of three-dimensional data was originally desired and of which the three-dimensional data has not been acquired by the scanner unit. In addition, a step of adding the three-dimensional data related to the characteristic portion of the measurement object having been acquired based on the survey result of the collimating ranging unit to the point cloud data having been acquired by the scanner unit is executed. In other words, a step of synthesizing the three-dimensional data related to the characteristic portion of the measurement object having been acquired based on the survey result of the collimating ranging unit and the point cloud data having been acquired by the scanner unit is executed. Accordingly, the three-dimensional survey method according to the present invention can more reliably acquire the three-dimensional data related to the characteristic portion of the measurement object.

The problem described above is solved by a three-dimensional survey program according to the present invention which is executed by a computer of a three-dimensional survey apparatus that acquires three-dimensional data of a measurement object, the three-dimensional survey apparatus including: a collimating ranging unit which irradiates the measurement object with first ranging light by collimation of a telescope portion and which, based on first reflected ranging light that is reflection of the first ranging light by the measurement object, measures a distance to the measurement object and detects a direction of the collimation; a scanner unit which is integrally provided with the collimating ranging unit and rotatingly emits second ranging light and which, based on second reflected ranging light that is reflection of the second ranging light by the measurement object, measures a distance to the measurement object and detects an emission direction of the second ranging light to acquire point cloud data related to the measurement object; and a control calculation portion which is provided in at least one of the collimating ranging unit and the scanner unit, wherein the three-dimensional survey program causes the computer to execute the step of: acquiring, based on a survey result of the collimating ranging unit, the three-dimensional data related to a characteristic portion of the measurement object which is present between a plurality of pieces of the three-dimensional data that are included in the point cloud data and of which the three-dimensional data has not been acquired by the scanner unit, and adding the three-dimensional data related to the characteristic portion having been acquired based on the survey result of the collimating ranging unit to the point cloud data.

With the three-dimensional survey program according to the present invention, three-dimensional data related to a characteristic portion of the measurement object which is present between a plurality of pieces of the three-dimensional data that are included in the point cloud data having been acquired by the scanner unit is acquired based on a survey result of the collimating ranging unit. The characteristic portion of the measurement object, as referred to herein, is a portion of the measurement object which is a corner portion, an edge portion, or the like of the measurement object for which acquisition of three-dimensional data was originally desired and of which the three-dimensional data has not been acquired by the scanner unit. In addition, a step of adding the three-dimensional data related to the characteristic portion of the measurement object having been acquired based on the survey result of the collimating ranging unit to the point cloud data having been acquired by the scanner unit is executed. In other words, a step of synthesizing the three-dimensional data related to the characteristic portion of the measurement object having been acquired based on the survey result of the collimating ranging unit and the point cloud data having been acquired by the scanner unit is executed. Accordingly, the three-dimensional survey program according to the present invention can more reliably acquire the three-dimensional data related to the characteristic portion of the measurement object.

According to the present invention, a three-dimensional survey apparatus, a three-dimensional survey method, and a three-dimensional survey program which are capable of more reliably acquiring three-dimensional data related to a characteristic portion of a measurement object can be provided.

DETAILED DESCRIPTION

Figure 1:
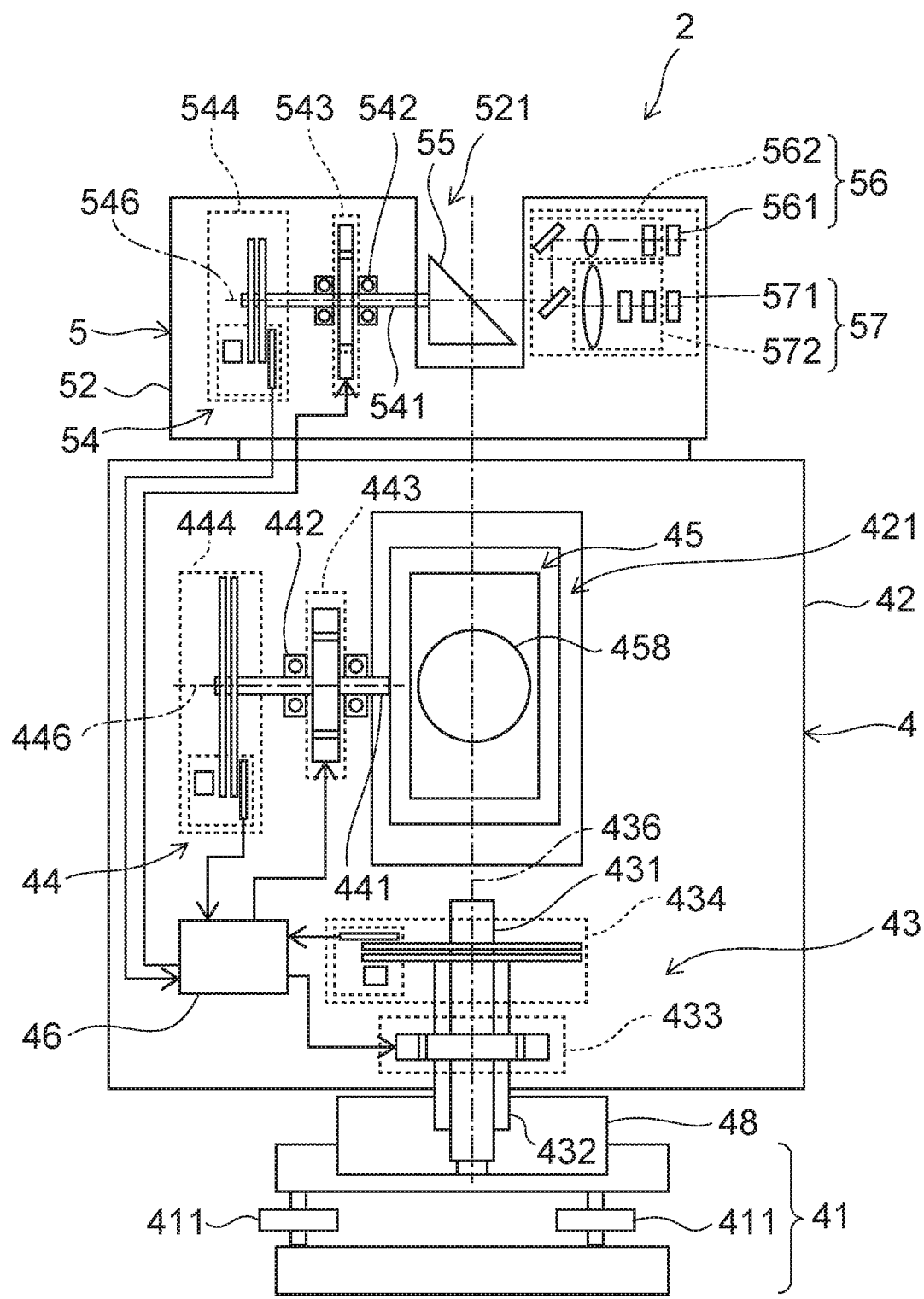
FIG. 1 is a block diagram which mainly shows a structural system of a three-dimensional survey apparatus according to an embodiment of the present invention.

Hereinafter, a preferred embodiment of the present invention will be described in detail with reference to the drawings.

Although the embodiment described hereinafter is a preferred specific example of the present invention and therefore involves various favorable technical limitations, it is to be understood that the scope of the present invention is by no means limited by the embodiment unless specifically noted otherwise hereinafter. It should also be noted that, in the drawings, similar components will be denoted by same reference signs and detailed descriptions thereof will be omitted when appropriate.

FIG. 1 is a block diagram which mainly shows a structural system of a three-dimensional survey apparatus according to an embodiment of the present invention.

Figure 2:
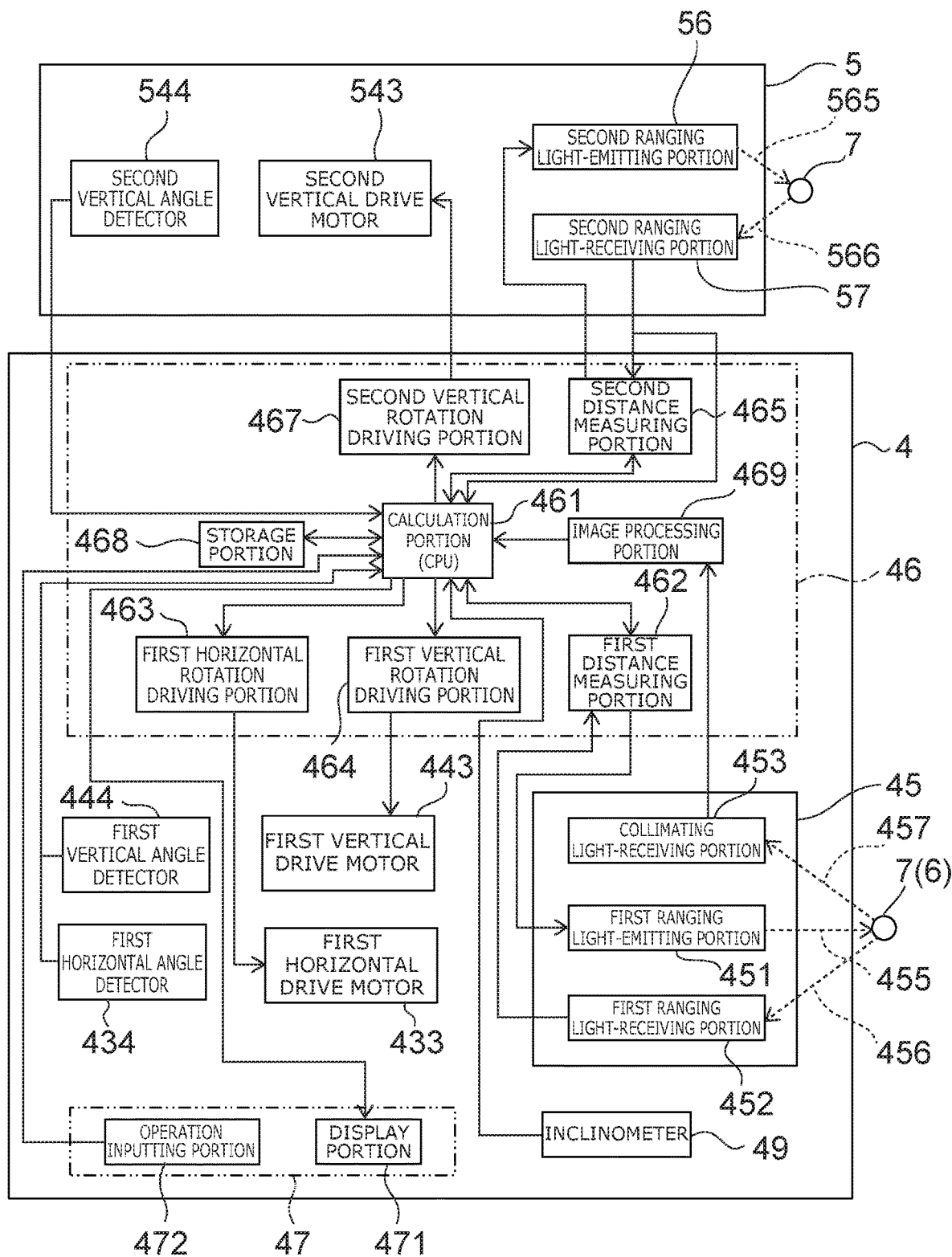
FIG. 2 is a block diagram which mainly shows a control system of the three-dimensional survey apparatus according to the present embodiment.

FIG. 2 is a block diagram which mainly shows a control system of the three-dimensional survey apparatus according to the present embodiment.

A three-dimensional survey apparatus 2 according to the present embodiment includes a collimating ranging unit 4 and a scanner unit 5 and acquires three-dimensional data of a measurement object 7 such as an architectural structure. The collimating ranging unit 4 is referred to as a total station or the like and, due to collimation of a telescope portion 45, irradiates the measurement object 7 with first ranging light 455 (refer to FIG. 2), measures a distance to the measurement object 7 based on first reflected ranging light 456 (refer to FIG. 2) that is the first ranging light 455 having been reflected by the measurement object 7 and first internal reference light (not illustrated), and detects an emission direction of the first ranging light 455 or, in other words, a direction of collimation of the telescope portion 45. In other words, the collimating ranging unit 4 is a device that performs ranging and angle measurement. Details of the collimating ranging unit 4 will be provided later.

Measurement objects of which the collimating ranging unit 4 performs ranging and angle measurement include a target of measurement 6 such as a prism. In other words, the collimating ranging unit 4 is capable of performing ranging and angle measurement with respect to the target of measurement 6 such as a prism as a measurement object. The prism to be used as the target of measurement 6 is not particularly limited and may be a circular prism, a spherical prism, or a planar prism.

The scanner unit 5 is integrally provided with the collimating ranging unit 4. In the three-dimensional survey apparatus 2 according to the present embodiment, the scanner unit 5 is fixed to an upper part of the collimating ranging unit 4. Alternatively, the scanner unit 5 may be rotatably provided relative to the collimating ranging unit 4. The scanner unit 5 irradiates the measurement object 7 with second ranging light 565 (refer to FIG. 2), measures a distance to the measurement object 7 based on second reflected ranging light 566 (refer to FIG. 2) that is reflection of the second ranging light 565 by the measurement object 7 and second internal reference light (not illustrated), and detects an emission direction of the second ranging light 565. The scanner unit 5 is a device that performs ranging and angle measurement in a similar manner to the collimating ranging unit 4.

More specifically, the scanner unit 5 acquires three-dimensional coordinates (three-dimensional data) of a large number of measurement points with respect to the measurement object 7 by performing rotational irradiation with the second ranging light 565 to measure the distance to the measurement object 7 and to detect the emission direction of the second ranging light 565. In other words, the scanner unit 5 acquires three-dimensional data (point cloud data) of a large number of measurement points of the measurement object 7. Details of the scanner unit 5 will be provided later.

The collimating ranging unit 4 according to the present embodiment has a leveling portion 41, a first mount portion 42, a first horizontal rotation portion 43, a first vertical rotation portion 44, the telescope portion 45, a control calculation portion 46, an operation display portion 47, a base portion 48, and an inclinometer 49. The collimating ranging unit 4 need not necessarily include the inclinometer 49. The collimating ranging unit 4 may have an automatic tracking function that automatically searches for the target of measurement 6 as a measurement object.

The control calculation portion 46 has a calculation portion 461, a first distance measuring portion 462, a first horizontal rotation driving portion 463, a first vertical rotation driving portion 464, a second distance measuring portion 465, a second vertical rotation driving portion 467, a storage portion 468, and an image processing portion 469. The calculation portion 461 is a central processing unit (CPU) or the like and, based on a signal (command) transmitted from an operation inputting portion 472 of the operation display portion 47, executes activation of a program, control processing of the signal, calculations, drive control of a display portion 471 of the operation display portion 47, and the like. In other words, the calculation portion 461 performs control of the entire three-dimensional survey apparatus 2 and causes the display portion 471 to display survey conditions, measurement results (ranging results and angle measurement results), image processing results (2D images of received light intensity), and the like.

Alternatively, the control calculation portion 46 may be provided in the scanner unit 5 or may be provided in both the collimating ranging unit 4 and the scanner unit 5. In other words, the control calculation portion 46 is provided in at least one of the collimating ranging unit 4 and the scanner unit 5.

The first distance measuring portion 462, the first horizontal rotation driving portion 463, the first vertical rotation driving portion 464, the second distance measuring portion 465, the second vertical rotation driving portion 467, and the image processing portion 469 are realized as the calculation portion 461 executes a program stored in the storage portion 468. Alternatively, the first distance measuring portion 462, the first horizontal rotation driving portion 463, the first vertical rotation driving portion 464, the second distance measuring portion 465, the second vertical rotation driving portion 467, and the image processing portion 469 may be realized by hardware or may be realized by a combination of hardware and software.

For example, the storage portion 468 stores a sequence program for measurement, an image processing program for image processing, a calculation program, or the like. Examples of the storage portion 468 include a semiconductor memory built into the three-dimensional survey apparatus 2 or the like. Other examples of the storage portion 468 include various storage media connectable to the three-dimensional survey apparatus 2 such as a compact disc (CD), a digital versatile disc (DVD), a random access memory (RAM), and a read only memory (ROM).

A program that is executed by a computer including the control calculation portion 46 corresponds to the "three-dimensional survey program" according to the present invention. A "computer" as used herein is not limited to a personal computer and collectively refers to devices and apparatuses capable of realizing functions of the present invention including arithmetic processing units and microcomputers included in information processing devices.

The leveling portion 41 is a portion to be attached to a tripod (not illustrated) and has, for example, three adjustment screws 411. Leveling of the leveling portion 41 is performed by adjusting, at a survey position, the adjustment screws 411 so that an inclination sensor (not illustrated) provided on the first mount portion 42 detects level. In other words, the first mount portion 42 is kept level by leveling using the adjustment screws 411 at a survey position.

The first horizontal rotation portion 43 has a first horizontal rotary shaft 431, a bearing 432, a first horizontal drive motor 433, and a first horizontal angle detector (for example, an encoder) 434. The first horizontal rotary shaft 431 has a vertically-extending first vertical axial center 436 and is rotatably supported by the base portion 48 via the bearing 432. The first mount portion 42 is supported by the first horizontal rotary shaft 431 and integrally rotates with the first horizontal rotary shaft 431 in a horizontal direction around the first vertical axial center 436 due to a drive force transmitted from the first horizontal drive motor 433.

A rotational angle of the first horizontal rotary shaft 431 relative to the base portion 48 (in other words, a rotational angle of the first mount portion 42) is detected by the first horizontal angle detector 434. A detection result of the first horizontal angle detector 434 is input to the calculation portion 461. Drive of the first horizontal drive motor 433 is controlled by the first horizontal rotation driving portion 463 based on the detection result of the first horizontal angle detector 434.

The first vertical rotation portion 44 has a first vertical rotary shaft 441, a bearing 442, a first vertical drive motor 443, and a first vertical angle detector (for example, an encoder) 444. The first vertical rotary shaft 441 has a horizontally-extending first horizontal axial center 446 and is rotatably supported by the first mount portion 42 via the bearing 442. One end of the first vertical rotary shaft 441 protrudes into a gap portion 421 of the first mount portion 42. The telescope portion 45 is supported by the one end of the first vertical rotary shaft 441 that protrudes into the gap portion 421 of the first mount portion 42, and integrally rotates with the first vertical rotary shaft 441 in a vertical direction around the first horizontal axial center 446 due to a drive force transmitted from the first vertical drive motor 443.

The first vertical angle detector 444 is provided at another end of the first vertical rotary shaft 441. A rotational angle of the first vertical rotary shaft 441 relative to the first mount portion 42 (in other words, a rotational angle of the telescope portion 45) is detected by the first vertical angle detector 444. A detection result of the first vertical angle detector 444 is input to the calculation portion 461. Drive of the first vertical drive motor 443 is controlled by the first vertical rotation driving portion 464 based on the detection result of the first vertical angle detector 444.

As described earlier, the telescope portion 45 is supported by the first vertical rotary shaft 441 and rotates in a vertical direction around the first horizontal axial center 446 due to a drive force transmitted from the first vertical drive motor 443. The telescope portion 45 has a collimating telescope 458, and is collimated to the measurement object 7 including the target of measurement 6 and irradiates the measurement object 7 with the first ranging light 455. The first ranging light 455 is emitted onto a ranging optical axis of the telescope portion 45. The ranging optical axis of the telescope portion 45 intersects with the first vertical axial center 436 and is perpendicular to the first horizontal axial center 446. An intersection point of the ranging optical axis of the telescope portion 45 and the first vertical axial center 436 may be set to a machine reference point of the collimating ranging unit 4. In the description of the present embodiment, a case where the machine reference point of the collimating ranging unit 4 is an intersection point of the ranging optical axis of the telescope portion 45 and the first vertical axial center 436 will be cited as an example.

The telescope portion 45 has a first ranging light-emitting portion 451, a first ranging light-receiving portion 452, and a collimating light-receiving portion 453.

The first ranging light-emitting portion 451 is driven and controlled by the first distance measuring portion 462. The first ranging light-emitting portion 451 is provided inside the telescope portion 45 and, for example, emits the first ranging light 455 that is a laser beam or the like in a direction perpendicular to the first horizontal axial center 446. The first ranging light 455 emitted from the first ranging light-emitting portion 451 irradiates the measurement object 7. As described earlier, the measurement object of which the collimating ranging unit 4 performs ranging and angle measurement is not limited to the measurement object 7 such as an architectural structure and may be the target of measurement 6 such as a prism. The first reflected ranging light 456 that is reflected by the measurement object 7 is received by the first ranging light-receiving portion 452 provided inside the telescope portion 45. The first ranging light-receiving portion 452 converts brightness and darkness (a light reception result) of the received first reflected ranging light 456 into an electronic signal (a light reception signal) and transmits the light reception signal to the first distance measuring portion 462. In addition, the first ranging light-receiving portion 452 receives internal reference light (not illustrated) guided from a reference light optical portion (not illustrated), converts the internal reference light into an electric signal, and transmits the electrical signal to the first distance measuring portion 462.

The first distance measuring portion 462 calculates the distance to the measurement object 7 based on the light reception signal transmitted from the first ranging light-receiving portion 452. In other words, the first reflected ranging light 456 and the internal reference light are respectively converted into a first reflected ranging light electrical signal and an internal reference light electrical signal and then sent to the first distance measuring portion 462. The distance to the measurement object 7 is measured based on a difference in time intervals between the first reflected ranging light electrical signal and the internal reference light electrical signal. A calculation result of the first distance measuring portion 462 is input to the calculation portion (CPU) 461.

The calculation portion 461 calculates coordinates of the measurement object 7 based on the measured distance to the measurement object 7, a vertical angle detected by the first vertical angle detector 444, and a horizontal angle detected by the first horizontal angle detector 434. Alternatively, the calculation portion 461 may calculate coordinates of the machine reference point of the collimating ranging unit 4 with a prescribed position as a reference based on the measured distance to the measurement object 7, the vertical angle detected by the first vertical angle detector 444, and the horizontal angle detected by the first horizontal angle detector 434.

The collimating light-receiving portion 453 is an image sensor such as a charge coupled device (CCD) or a complementary metal oxide semiconductor (CMOS) and receives reflected collimating light 457 with a wavelength region that differs from a wavelength region of the first reflected ranging light 456. The reflected collimating light 457 is light which has a wavelength region that differs from a wavelength region of the first reflected ranging light 456 and which is reflected by the measurement object 7. In other words, the collimating light-receiving portion 453 receives the reflected collimating light 457 that is reflected by the measurement object 7 and optically receives an image of the measurement object 7. Examples of the reflected collimating light 457 include natural light and infrared light. However, the reflected collimating light 457 is not limited thereto. The reflected collimating light 457 is received by the collimating light-receiving portion 453 provided inside the telescope portion 45. The collimating light-receiving portion 453 converts brightness and darkness (a light reception result) of the reflected collimating light 457 into an electronic signal (an image signal) and transmits the image signal to the image processing portion 469.

The image processing portion 469 executes image processing of the image signal transmitted from the collimating light-receiving portion 453 and transmits the processed image signal to the calculation portion 461 as an image data signal. The calculation portion 461 executes a calculation based on the image data signal transmitted from the image processing portion 469 and executes control to cause the display portion 471 of the operation display portion 47 to display an image of a collimation range of the telescope portion 45.

The inclinometer 49 measures an inclination (an inclination angle) of the collimating ranging unit 4 relative to gravity. A measurement result of the inclinometer 49 is input to the calculation portion 461.

The scanner unit 5 according to the present embodiment has a second mount portion 52, a second vertical rotation portion 54, a scanning mirror 55, a second ranging light-emitting portion 56, and a second ranging light-receiving portion 57 and is fixed to an upper part of the collimating ranging unit 4. Alternatively, the scanner unit 5 may have a horizontal rotation portion similar to the first horizontal rotation portion 43 of the collimating ranging unit 4. In this case, the scanner unit 5 is rotatably provided in the horizontal direction relative to the collimating ranging unit 4.

The second vertical rotation portion 54 has a second vertical rotary shaft 541, a bearing 542, a second vertical drive motor 543, and a second vertical angle detector (for example, an encoder) 544. The second vertical rotary shaft 541 has a horizontally-extending second horizontal axial center 546 and is rotatably supported by the second mount portion 52 via the bearing 542. One end of the second vertical rotary shaft 541 protrudes into a recessed portion 521 of the second mount portion 52. The scanning mirror 55 is supported by the one end of the second vertical rotary shaft 541 that protrudes into the recessed portion 521 of the second mount portion 52, and integrally rotates with the second vertical rotary shaft 541 in a vertical direction around the second horizontal axial center 546 due to a drive force transmitted from the second vertical drive motor 543.

The second vertical angle detector 544 is provided at another end of the second vertical rotary shaft 541. A rotational angle of the second vertical rotary shaft 541 relative to the second mount portion 52 (in other words, a rotational angle of the scanning mirror 55) is detected by the second vertical angle detector 544. A detection result of the second vertical angle detector 544 is input to the calculation portion 461. Drive of the second vertical drive motor 543 is controlled by the second vertical rotation driving portion 467 based on the detection result of the second vertical angle detector 544.

The second horizontal axial center 546 is parallel to the first horizontal axial center 446. A distance between the first horizontal axial center 446 and the second horizontal axial center 546 is known. In other words, a position of the second horizontal axial center 546 relative to the first horizontal axial center 446 is known.

The scanning mirror 55 is a deflecting optical member and reflects, at a right angle, the second ranging light 565 incident from a horizontal direction. In other words, the scanning mirror 55 reflects, in a direction perpendicular to the second horizontal axial center 546, the second ranging light 565 incident from a horizontal direction. As described earlier, the scanning mirror 55 is supported by the second vertical rotary shaft 541 and rotates in a vertical direction around the second horizontal axial center 546 due to a drive force transmitted from the second vertical drive motor 543. Accordingly, the scanning mirror 55 causes rotational irradiation with the second ranging light 565 to be performed within a plane that intersects with (specifically, perpendicular to) the second horizontal axial center 546. In addition, the scanning mirror 55 reflects, toward the second ranging light-receiving portion 57, the second reflected ranging light 566 reflected by the measurement object 7 and incident to the scanning mirror 55. In other words, the scanning mirror 55 reflects, in a direction parallel to the second horizontal axial center 546, the second reflected ranging light 566 reflected by the measurement object 7 and incident to the scanning mirror 55.

An intersection point of the second horizontal axial center 546 and the scanning mirror 55 is set to a machine reference point of the scanner unit 5. For example, the machine reference point of the collimating ranging unit 4 and the machine reference point of the scanner unit 5 are present on the first vertical axial center 436 as a same straight line. In other words, a vertical line that passes the machine reference point of the scanner unit 5 coincides with the first vertical axial center 436. A distance between the machine reference point of the collimating ranging unit 4 and the machine reference point of the scanner unit 5 is known.

As shown in FIG. 2, the second ranging light-emitting portion 56 has a light-emitting element 561 and a light-emitting optical portion 562 including an objective lens or the like and is driven and controlled by the second distance measuring portion 465. The light-emitting element 561 is, for example, a semiconductor laser and emits the second ranging light 565 via the light-emitting optical portion 562 onto an optical axis that matches the second horizontal axial center 546. The second ranging light 565 is a pulse laser beam of infrared light as invisible light. The light-emitting element 561 is controlled by the second distance measuring portion 465 and emits pulse light in a required state including a required light intensity and a required pulse interval.

As shown in FIG. 2, the second ranging light-receiving portion 57 has a light-receiving element 571 and a light-receiving optical portion 572 including a condenser lens or the like. The light-receiving element 571 receives the second reflected ranging light 566 which is the second ranging light 565 having been reflected by the measurement object 7, having been reflected by the scanning mirror 55, and having passed through the light-receiving optical portion 572. The light-receiving element 571 converts brightness and darkness (a light reception result) of the received second reflected ranging light 566 into an electronic signal (a light reception signal) and transmits the light reception signal to the second distance measuring portion 465 and the calculation portion 461. In addition, the light-receiving element 571 receives internal reference light (not illustrated) guided from the reference light optical portion (not illustrated), converts the internal reference light into an electric signal, and transmits the electrical signal to the second distance measuring portion 465.

The second distance measuring portion 465 calculates the distance to the measurement object 7 based on the light reception signal transmitted from the second ranging light-receiving portion 57 (specifically, the light-receiving element 571). In other words, the second reflected ranging light 566 and the internal reference light are respectively converted into a second reflected ranging light electrical signal and an internal reference light electrical signal and then sent to the second distance measuring portion 465. The distance to the measurement object 7 is measured based on a difference in time intervals between the second reflected ranging light electrical signal and the internal reference light electrical signal. A calculation result of the second distance measuring portion 465 is input to the calculation portion 461.

The calculation portion 461 calculates coordinates of the measurement object 7 based on the measured distance to the measurement object 7, a vertical angle detected by the second vertical angle detector 544, and a horizontal angle detected by the first horizontal angle detector 434. In addition, by recording coordinates of the measurement object 7 for each pulse light beam, the calculation portion 461 can obtain point cloud data with respect to an entire measurement range or point cloud data with respect to the measurement object 7.

Furthermore, the calculation portion 461 calculates intensity (reflection intensity) of the second reflected ranging light 566 based on a light reception signal transmitted from the light-receiving element 571 of the second ranging light-receiving portion 57 and executes control to cause an image indicating the intensity of the second reflected ranging light 566 to be superimposed on an image of a collimation range of the telescope portion 45 and to be displayed by the display portion 471 of the operation display portion 47. Accordingly, the worker or the like can check, on the display portion 471, a measurement location (a point or a region) where three-dimensional data has been acquired and a measurement location (a point or a region) where three-dimensional data has not been acquired among the measurement object 7. In other words, the worker or the like can check, on the display portion 471, whether or not there is a data-deficient part that is referred to as a "missing part" or the like where three-dimensional data is not acquired among the measurement object 7 when the scanner unit 5 acquires point cloud data.

Next, operations of the three-dimensional survey apparatus according to the present embodiment will be described with reference to the drawings.

Figure 3:
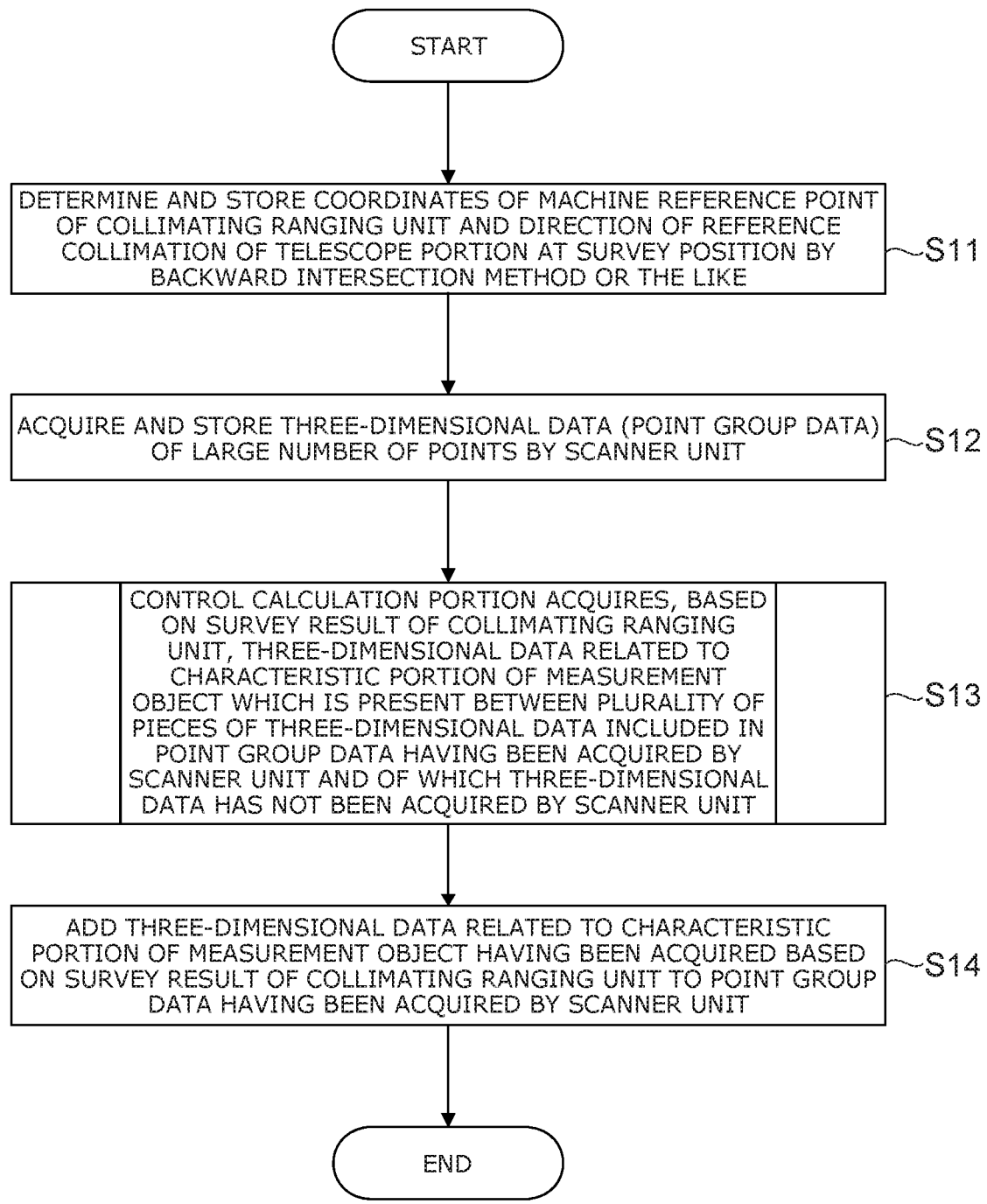
FIG. 3 is a flow chart which shows operations of the three-dimensional survey apparatus according to the present embodiment.
Figure 4:
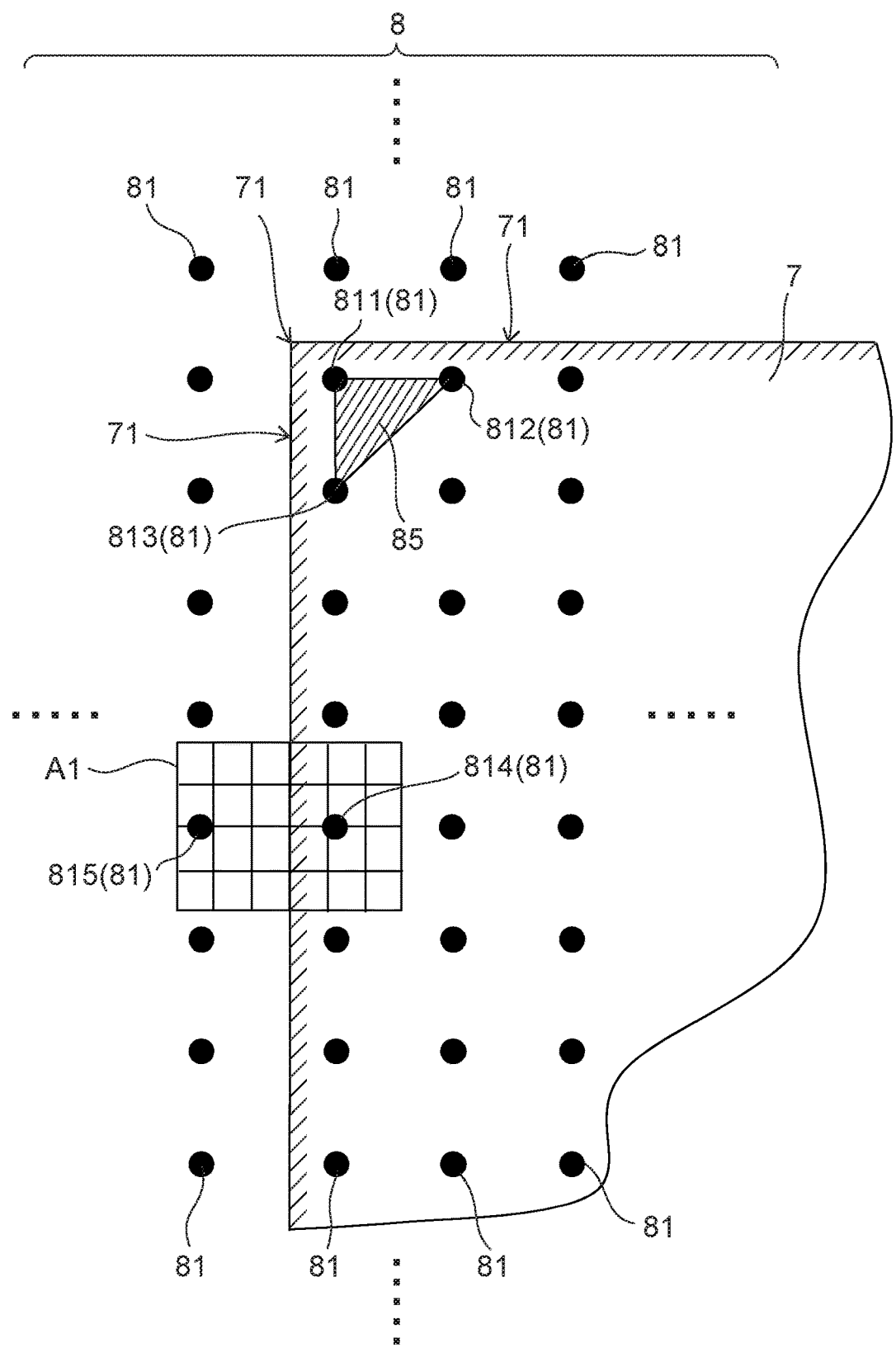
FIG. 4 is a plan view that represents a vicinity of a characteristic portion of a measurement object.

FIG. 3 is a flow chart that represents operations of the three-dimensional survey apparatus according to the present embodiment. FIG. 4 is a plan view that represents a vicinity of a characteristic portion of a measurement object. FIG. 3 is, in other words, a flow chart that represents steps executed by the three-dimensional survey method according to the present embodiment and steps which the three-dimensional survey program according to the present embodiment causes a computer of the three-dimensional survey apparatus 2 to execute.

First, in step S11, the control calculation portion 46 of the three-dimensional survey apparatus 2 determines coordinates of a machine reference point of the collimating ranging unit 4 and a direction of a reference collimation of the telescope portion 45 of the collimating ranging unit 4 at a survey position using a backward intersection method or the like and stores the coordinates and the direction in the storage portion 468. Specifically, based on a distance from the collimating ranging unit 4 to the target of measurement 6 such as a prism, a vertical angle detected by the first vertical angle detector 444, and a horizontal angle detected by the first horizontal angle detector 434, the control calculation portion 46 calculates coordinates of a machine reference point of the collimating ranging unit 4 and a direction of a reference collimation of the telescope portion 45 of the collimating ranging unit 4 and stores the coordinates and the direction in the storage portion 468.

Next, in step S12, the control calculation portion 46 controls the scanner unit 5 to acquire and store three-dimensional data (point cloud data) of a large number of measurement points of the measurement object 7.

Next, in step S13, the control calculation portion 46 acquires, based on a survey result of the collimating ranging unit 4, three-dimensional data related to a characteristic portion 71 of the measurement object 7 which is present between a plurality of pieces of the three-dimensional data 81 (refer to FIG. 4) that are included in the point cloud data 8 (refer to FIG. 4) having been acquired by the scanner unit 5. The "characteristic portion 71 of the measurement object 7", as referred to herein, is the characteristic portion 71 of the measurement object 7 which is a corner portion, an edge portion, or the like of the measurement object 7 for which acquisition of three-dimensional data was originally desired and of which the three-dimensional data has not been acquired by the scanner unit 5.

More specifically, as represented in FIG. 4, the scanner unit 5 rotates and irradiates pulse laser light in a direction of a predetermined angle and performs ranging for each pulse of pulse laser light to acquire the point cloud data 8. Therefore, the point cloud data 8 acquired by the scanner unit 5 has a grid structure. In other words, a plurality of pieces of three-dimensional data 81 that are included in the point cloud data 8 having been acquired by the scanner unit 5 are pieces of three-dimensional data related to portions which are separated from one another in the measurement object 7 and which are positioned in, for example, a grid pattern. Therefore, the characteristic portion 71 such as a corner portion or an edge portion of the measurement object 7 for which acquisition of three-dimensional data was originally desired may be present between a plurality of pieces of three-dimensional data 81 that are included in the point cloud data 8 having been acquired by the scanner unit 5 and may not be acquired by the scanner unit 5.

Conversely, in step S13, the control calculation portion 46 of the three-dimensional survey apparatus 2 according to the present embodiment acquires, based on a survey result of the collimating ranging unit 4, three-dimensional data related to the characteristic portion 71 of the measurement object 7 which is present between a plurality of pieces of the three-dimensional data 81 that are included in the point cloud data 8 having been acquired by the scanner unit 5 and of which the three-dimensional data has not been acquired by the scanner unit 5.

Next, in step S14, the control calculation portion 46 adds the three-dimensional data related to the characteristic portion 71 of the measurement object 7 having been acquired based on the survey result of the collimating ranging unit 4 to the point cloud data 8 having been acquired by the scanner unit 5.

With the three-dimensional survey apparatus 2 according to the present embodiment, the control calculation portion 46 performs control to acquire, based on a survey result of the collimating ranging unit 4, three-dimensional data related to the characteristic portion 71 of the measurement object 7 which is present between a plurality of pieces of the three-dimensional data 81 that are included in the point cloud data 8 having been acquired by the scanner unit 5 and of which the three-dimensional data has not been acquired by the scanner unit 5, and to add the three-dimensional data related to the characteristic portion 71 of the measurement object 7 having been acquired based on a survey result of the collimating ranging unit 4 to the point cloud data 8 having been acquired by the scanner unit 5. In other words, the control calculation portion 46 executes control to synthesize the three-dimensional data related to the characteristic portion 71 of the measurement object 7 having been acquired based on the survey result of the collimating ranging unit 4 and the point cloud data 8 having been acquired by the scanner unit 5. Accordingly, the three-dimensional survey apparatus 2 according to the present invention can more reliably acquire the three-dimensional data related to the characteristic portion 71 of the measurement object 7.

Next, specific examples of the processing of step S13 represented in FIG. 3 will be described in detail with reference to the drawings.

Figure 5:
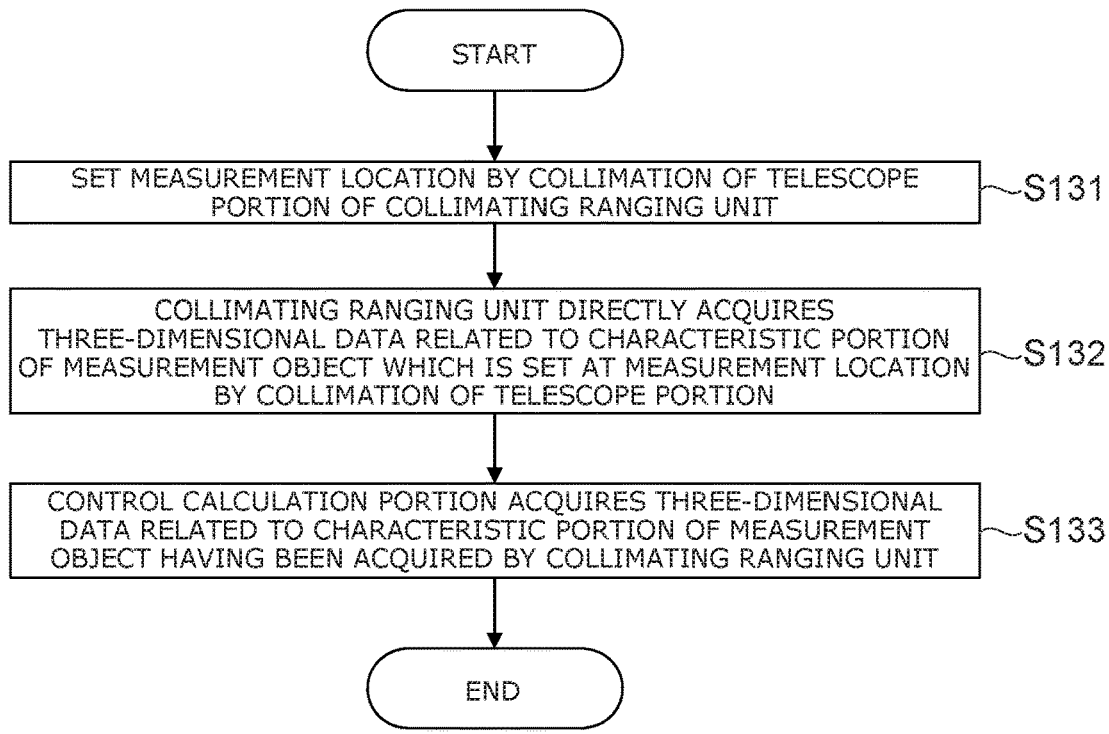
FIG. 5 is a flow chart that represents a first specific example of processing of step S13 represented in FIG. 3.

FIG. 5 is a flow chart that represents a first specific example of the processing of step S13 represented in FIG. 3.

In the present specific example, first, in step S131, a measurement location is set by collimation of the telescope portion 45 of the collimating ranging unit 4. For example, based on an image displayed on the display portion 471, the worker or the like performs collimation of the telescope portion 45 with respect to the characteristic portion 71 that is a corner portion, an edge portion, or the like of the measurement object 7 for which acquisition of three-dimensional data is desired and sets a measurement location to be ranged by the collimating ranging unit 4.

Next, in step S132, the collimating ranging unit 4 performs a survey (ranging and angle measurement) of the characteristic portion 71 of the measurement object 7 having been set at a measurement location by the collimation of the telescope portion 45 of the collimating ranging unit 4 to directly acquire the three-dimensional data related to the characteristic portion 71 of the measurement object 7.

Next, in step S15, the control calculation portion 46 acquires the three-dimensional data related to the characteristic portion 71 of the measurement object 7 having been acquired by the collimating ranging unit 4. For example, the control calculation portion 46 receives, from the collimating ranging unit 4, a signal of the three-dimensional data related to the characteristic portion 71 of the measurement object 7 having been acquired by the collimating ranging unit 4, and acquires the signal as the three-dimensional data related to the characteristic portion 71 of the measurement object 7.

According to the present specific example, the control calculation portion 46 can directly acquire the three-dimensional data related to the characteristic portion 71 of the measurement object 7 with the collimating ranging unit 4 and more reliably add the three-dimensional data related to the characteristic portion 71 of the measurement object 7 having been directly acquired by the collimating ranging unit 4 to the point cloud data 8 having been acquired by the scanner unit 5.

Figure 6:
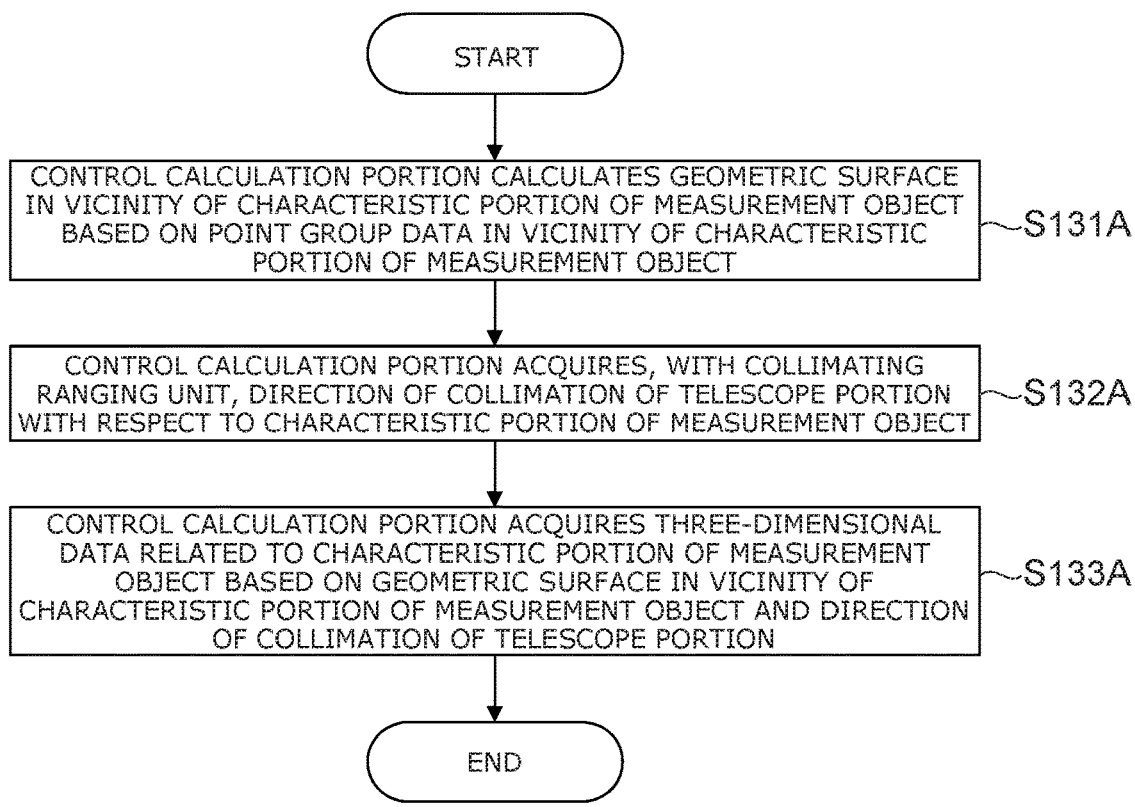
FIG. 6 is a flow chart that represents a second specific example of processing of step S13 represented in FIG. 3.

FIG. 6 is a flow chart that represents a second specific example of the processing of step S13 represented in FIG. 3.

In the present specific example, first, in step S131A, the control calculation portion 46 calculates a geometric surface in a vicinity of the characteristic portion 71 of the measurement object 7 based on the point cloud data 8 in the vicinity of the characteristic portion 71 of the measurement object 7.

For example, as represented in FIG. 4, the control calculation portion 46 calculates a geometric surface 85 in the vicinity of the characteristic portion 71 of the measurement object 7 based on the point cloud data 8 that includes three pieces of three-dimensional data 811, 812, and 813 in the vicinity of the characteristic portion 71 of the measurement object 7. The surface 85 in the vicinity of the characteristic portion 71 of the measurement object 7 is not limited to a flat surface and may be a curved surface, a cylindrical surface, or a spherical surface. Therefore, the geometric surface 85 that is calculated by the control calculation portion 46 is not limited to a flat surface and examples thereof include a curved surface, a cylindrical surface, and a spherical surface. It should be noted that the three-dimensional data to be referred to when the control calculation portion 46 calculates the geometric surface 85 is not limited to the three pieces of three-dimensional data 811, 812, and 813 and there may be four or more pieces of three-dimensional data.

Next, in step S132A, the control calculation portion 46 acquires, with the collimating ranging unit 4, a direction of collimation of the telescope portion 45 with respect to the characteristic portion 71 of the measurement object 7. For example, based on an image displayed on the display portion 471, the worker or the like performs collimation of the telescope portion 45 with respect to the characteristic portion 71 that is a corner portion, an edge portion, or the like of the measurement object 7 for which acquisition of three-dimensional data is desired. Accordingly, the collimating ranging unit 4 can acquire the direction of the collimation of the telescope portion 45 with respect to the characteristic portion 71 of the measurement object 7.

Specifically, as described earlier with reference to FIGS. 1 and 2, when the collimation of the telescope portion 45 is performed with respect to a prescribed portion, the calculation portion 461 of the control calculation portion 46 can acquire a vertical angle having been detected by the first vertical angle detector 444 and a horizontal angle having been detected by the first horizontal angle detector 434. In other words, the collimating ranging unit 4 can perform angle measurement based on a vertical angle having been detected by the first vertical angle detector 444 and a horizontal angle having been detected by the first horizontal angle detector 434. Accordingly, for example, when the worker or the like performs the collimation of the telescope portion 45 with respect to the characteristic portion 71 of the measurement object 7, the control calculation portion 46 can acquire, with the collimating ranging unit 4, a direction of the collimation of the telescope portion 45 with respect to the characteristic portion 71 of the measurement object 7.

Next, in step S133A, the control calculation portion 46 acquires the three-dimensional data related to the characteristic portion 71 of the measurement object 7 based on the geometric surface 85 in the vicinity of the characteristic portion 71 of the measurement object 7 and the direction of the collimation of the telescope portion 45. For example, the control calculation portion 46 assumes that the characteristic portion 71 of the measurement object 7 is present on an extension of the geometric surface 85 having been calculated based on the point cloud data 8 including three pieces of three-dimensional data 811, 812, and 813 in the vicinity of the characteristic portion 71 of the measurement object 7, and acquires the three-dimensional data related to the characteristic portion 71 of the measurement object 7 by applying the direction of the collimation of the telescope portion 45 having been detected by the collimating ranging unit with respect to the calculated geometric surface 85. In other words, the control calculation portion 46 can perform ranging related to the characteristic portion 71 of the measurement object 7 by applying the direction of the collimation of the telescope portion 45 with respect to the calculated geometric surface 85.

According to the present specific example, even when the characteristic portion 71 of the measurement object 7 such as a corner portion or an edge portion of the measurement object 7 is a portion of which the three-dimensional data is difficult to acquire with the collimating ranging unit 4, the control calculation portion 46 can more reliably acquire the three-dimensional data related to the characteristic portion 71 of the measurement object 7 based on the geometric surface 85 in the vicinity of the characteristic portion 71 of the measurement object 7 and the direction of the collimation of the telescope portion 45. Specifically, depending on a shape of the characteristic portion 71 of the measurement object 7 or the direction of the collimation of the telescope portion 45, low intensity of the first reflected ranging light 456 (refer to FIG. 2) or a virtual absence of the first reflected ranging light 456 may prevent the collimating ranging unit 4 from ranging the characteristic portion 71 of the measurement object 7 and prevent the three-dimensional data related to the characteristic portion 71 from being acquired. On the other hand, even when the collimating ranging unit 4 is unable to range the characteristic portion 71 of the measurement object 7, the collimating ranging unit 4 can reliably detect the direction of the collimation of the telescope portion 45 and reliably perform angle measurement of the characteristic portion 71 of the measurement object 7. Therefore, by calculating the geometric surface 85 in the vicinity of the characteristic portion 71 of the measurement object 7 based on the point cloud data 8 in the vicinity of the characteristic portion 71 of the measurement object 7, acquiring a direction of the collimation of the telescope portion 45 with respect to the characteristic portion 71 of the measurement object 7 with the collimating ranging unit 4, and applying the direction of the collimation of the telescope portion 45 having been detected by the collimating ranging unit 4 with respect to the geometric surface 85 in the vicinity of the characteristic portion 71 of the measurement object 7, the control calculation portion 46 can more reliably acquire the three-dimensional data related to the characteristic portion 71 of the measurement object 7. Accordingly, the control calculation portion 46 can more reliably add the three-dimensional data related to the characteristic portion 71 of the measurement object 7 to the point cloud data 8 having been acquired by the scanner unit 5.

Figure 7:
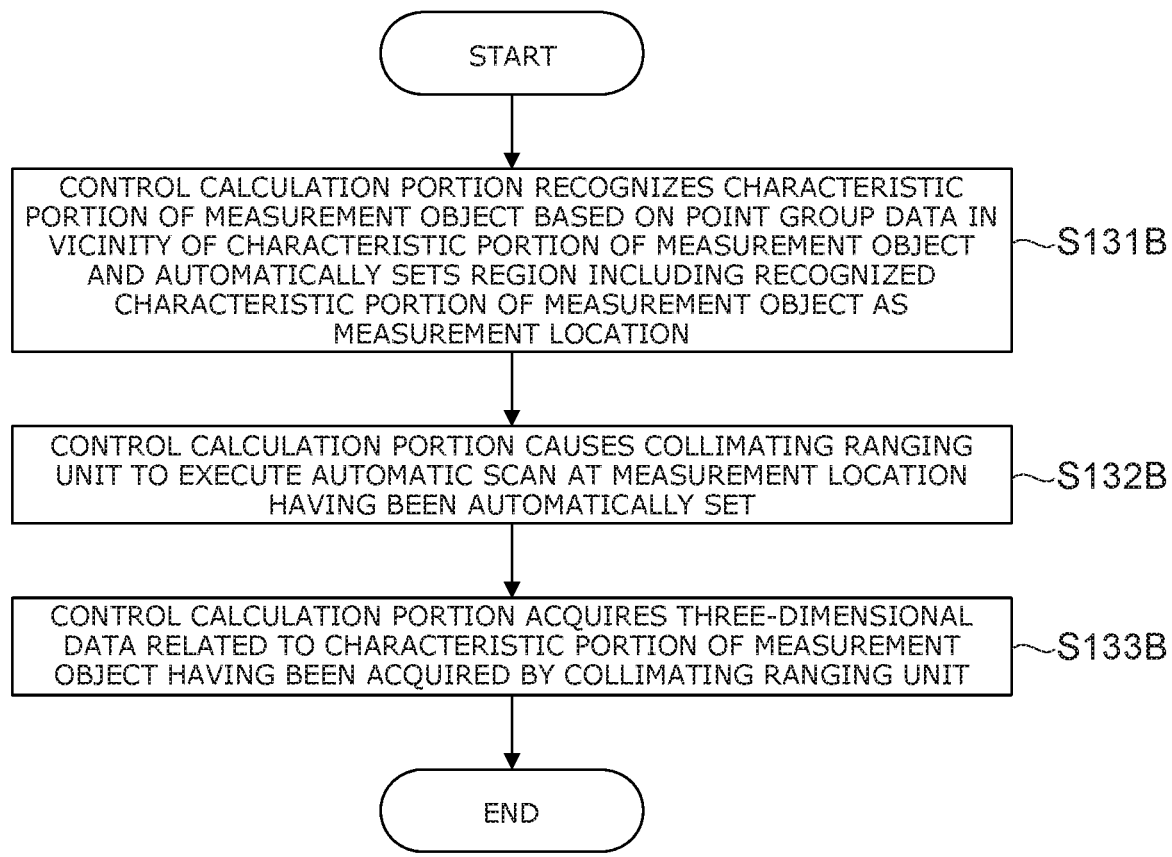
FIG. 7 is a flow chart that represents a third specific example of processing of step S13 represented in FIG. 3.

FIG. 7 is a flow chart that represents a third specific example of the processing of step S13 represented in FIG. 3.

In the present specific example, first, in step S131B, the control calculation portion 46 recognizes the characteristic portion 71 of the measurement object 7 based on the point cloud data 8 in the vicinity of the characteristic portion 71 of the measurement object 7. For example, as represented in FIG. 4, based on a piece of three-dimensional data 814 that is present on the measurement object 7 and a piece of background three-dimensional data 815 that is not present on the measurement object 7, the control calculation portion 46 can recognize a position or a shape of the characteristic portion 71 that is a corner portion, an edge portion, or the like of the measurement object 7. Specifically, for example, when a difference between distance data among the piece of three-dimensional data 814 and distance data among the piece of three-dimensional data 815 is equal to or greater than a predetermined value, the control calculation portion 46 can recognize that the characteristic portion 71 that is a corner portion, an edge portion, or the like of the measurement object 7 is present between the piece of three-dimensional data 814 and the piece of three-dimensional data 815. However, means by which the control calculation portion 46 recognizes the position or the shape of the characteristic portion 71 of the measurement object 7 is not limited thereto.

For example, the control calculation portion 46 may execute image processing based on an image signal transmitted from an imaging portion such as a camera built into the collimating ranging unit 4 and automatically extract the characteristic portion 71 of the measurement object 7. In other words, the collimating ranging unit 4 may have a built-in imaging portion such as a camera. In this case, a signal related to an image captured by the camera is transmitted to the control calculation portion 46. The control calculation portion 46 can execute image processing based on the image signal transmitted from the camera and automatically recognize the position or the shape of the characteristic portion 71 that is a corner portion, an edge portion, or the like of the measurement object 7.

In addition, in step S131B, the control calculation portion 46 automatically sets a region A1 (refer to FIG. 4) including the recognized characteristic portion 71 of the measurement object 7 at the measurement location. It should be noted that the three-dimensional data to be referred to when the control calculation portion 46 recognizes the position or the shape of the characteristic portion 71 of the measurement object 7 is not limited to the two pieces of three-dimensional data 814 and 815 and there may be three or more pieces of three-dimensional data. In addition, the image signal used in the image processing when the control calculation portion 46 recognizes the position or the shape of the characteristic portion 71 of the measurement object 7 may include one piece of image data or may include a plurality of pieces of image data.

Next, in step S132B, the control calculation portion 46 causes the collimating ranging unit 4 to execute an automatic scan at the measurement location that has been automatically set. Next, in step S133B, the control calculation portion 46 acquires the three-dimensional data related to the characteristic portion 71 of the measurement object 7 having been acquired by the collimating ranging unit 4. As described above, in the present specific example, the control calculation portion 46 recognizes the characteristic portion 71 of the measurement object 7 based on the point cloud data 8 in the vicinity of the characteristic portion 71 of the measurement object 7, automatically sets a region A1 that includes the recognized characteristic portion 71 of the measurement object 7 at a measurement location, and causes the collimating ranging unit 4 to locally execute an automatic scan in the region A1 that includes the characteristic portion 71 of the measurement object 7. Alternatively, in the present specific example, the control calculation portion 46 automatically extracts the characteristic portion 71 of the measurement object 7 based on an image signal transmitted from an imaging portion such as a camera that is built into the collimating ranging unit 4, automatically sets a region A1 that includes the extracted characteristic portion 71 of the measurement object 7 at a measurement location, and causes the collimating ranging unit 4 to locally execute an automatic scan in the region A1 that includes the characteristic portion 71 of the measurement object 7.

According to the present specific example, even if the worker or the like does not set a measurement location to be automatically scanned by the collimating ranging unit 4 using the operation display portion 47 or the like, the control calculation portion 46 recognizes the characteristic portion 71 of the measurement object 7 based on the point cloud data 8 in the vicinity of the characteristic portion 71 of the measurement object 7 and automatically sets the measurement location to be automatically scanned by the collimating ranging unit 4. Alternatively, the control calculation portion 46 automatically recognizes the characteristic portion 71 of the measurement object 7 based on an image signal transmitted from an imaging portion such as a camera and automatically sets the measurement location to be automatically scanned by the collimating ranging unit 4. Accordingly, the control calculation portion 46 can efficiently acquire the three-dimensional data related to the characteristic portion 71 of the measurement object 7 with the collimating ranging unit 4 and efficiently add the three-dimensional data related to the characteristic portion 71 of the measurement object 7 to the point cloud data 8 having been acquired by the scanner unit 5.

An embodiment of the present invention has been described above. However, it is to be understood that the present invention is not limited to the embodiment described above and that various modifications can be made without departing from the scope of the appended claims. The configurations of the embodiment described above can be partially omitted or arbitrarily combined in manners that differ from those described above.

The invention claimed is:

1. A three-dimensional survey apparatus which acquires three-dimensional data of a measurement object, the three-dimensional survey apparatus comprising:
    a collimating ranging unit which irradiates the measurement object with first ranging light by collimation of a telescope portion and which, based on first reflected ranging light that is reflection of the first ranging light by the measurement object, measures a distance to the measurement object and detects a direction of the collimation;
    a scanner unit which is integrally provided with the collimating ranging unit and rotatingly emits second ranging light and which, based on second reflected ranging light that is reflection of the second ranging light by the measurement object, measures a distance to the measurement object and detects an emission direction of the second ranging light to acquire point cloud data related to the measurement object; and
    a control calculation portion which is provided in at least one of the collimating ranging unit and the scanner unit, wherein
    the control calculation portion executes control
        to recognize, based on a first piece of three-dimensional data of the point cloud data that is present on the measurement object and a second piece of background three-dimensional data of the point cloud data that is not present on the measurement object, a position or a shape of a characteristic portion of the measurement object which is present between the first piece of three-dimensional data and the second piece of background three-dimensional data, wherein a piece of the three-dimensional data of the characteristic portion has not been acquired by the scanner unit,
        to acquire, based on a survey result of the collimating ranging unit, three-dimensional data related to the characteristic portion,
        to add the three-dimensional data related to the characteristic portion having been acquired based on the survey result of the collimating ranging unit to the point cloud data,
        to automatically set a region including the recognized characteristic portion at a measurement location, and acquire the three-dimensional data related to the characteristic portion by having the collimating ranging unit execute an automatic scan at the measurement location, and
    when a difference between distance data among the first piece of three-dimensional data and distance data among the second piece of three-dimensional data in the region is equal to or greater than a predetermined value, to recognize that the characteristic portion is a corner portion or an edge portion of the measurement object.

2. The three-dimensional survey apparatus according to claim 1, wherein the control calculation portion directly acquires the three-dimensional data related to the characteristic portion having been set at a measurement location by the collimation of the telescope portion by the collimating ranging unit.

3. The three-dimensional survey apparatus according to claim 1, wherein the control calculation portion calculates a geometric surface in a vicinity of the characteristic portion based on the point cloud data in the vicinity of the characteristic portion, acquires a direction of the collimation of the telescope portion with respect to the characteristic portion by the collimating ranging unit, and acquires the three-dimensional data related to the characteristic portion based on the geometric surface and the direction of the collimation of the telescope portion.

4. The three-dimensional survey apparatus according to claim 1, wherein the control calculation portion recognizes that the characteristic portion is present between the first piece of three-dimensional data and the second piece of three-dimensional data based on a difference between distance data among the first piece of three-dimensional data and distance data among the second piece of three-dimensional data.

5. The three-dimensional survey apparatus according to claim 1, wherein
    the collimating ranging unit has a built-in imaging portion, and
    the control calculation portion is configured to execute image processing based on an image signal transmitted from the built-in imaging portion and recognizes the position or the shape of the characteristic portion.

6. A three-dimensional survey method which is executed by a three-dimensional survey apparatus that acquires three-dimensional data of a measurement object, the three-dimensional survey apparatus including:
    a collimating ranging unit which irradiates the measurement object with first ranging light by collimation of a telescope portion and which, based on first reflected ranging light that is reflection of the first ranging light by the measurement object, measures a distance to the measurement object and detects a direction of the collimation;
    a scanner unit which is integrally provided with the collimating ranging unit and rotatingly emits second ranging light and which, based on second reflected ranging light that is reflection of the second ranging light by the measurement object, measures a distance to the measurement object and detects an emission direction of the second ranging light to acquire point cloud data related to the measurement object; and
    a control calculation portion which is provided in at least one of the collimating ranging unit and the scanner unit, wherein
    the three-dimensional survey method comprises the steps of:
        recognizing, based on a first piece of three-dimensional data of the point cloud data that is present on the measurement object and a second piece of background three-dimensional data of the point cloud data that is not present on the measurement object, a position or a shape of a characteristic portion of the measurement object which is present between the first piece of three-dimensional data and the second piece of background three-dimensional data, wherein a piece of the three-dimensional data of the characteristic portion has not been acquired by the scanner unit,
        acquiring, based on a survey result of the collimating ranging unit, three-dimensional data related to the characteristic portion,
        adding the three-dimensional data related to the characteristic portion having been acquired based on the survey result of the collimating ranging unit to the point cloud data,
        automatically setting a region including the recognized characteristic portion at a measurement location, and acquiring the three-dimensional data related to the characteristic portion by having the collimating ranging unit execute an automatic scan at the measurement location, and when a difference between distance data among the first piece of three-dimensional data and distance data among the second piece of three-dimensional data in the region is equal to or greater than a predetermined value, recognizing that the characteristic portion is a corner portion or an edge portion of the measurement object.

7. A non-transitory computer-readable memory medium configured to store three-dimensional survey computer program instructions, executed by a computer of a three-dimensional survey apparatus that acquires three-dimensional data of a measurement object, the three-dimensional survey computer program instructions, when executed by the computer of the three-dimensional survey apparatus, cause the computer to execute the steps of:

recognizing, based on a first piece of three-dimensional data of point cloud data that is present on the measurement object and a second piece of background three-dimensional data of the point cloud data that is not present on the measurement object, a position or a shape of a characteristic portion of the measurement object which is present between the first piece of three-dimensional data and the second piece of background three-dimensional data, wherein a piece of the three-dimensional data of the characteristic portion has not been acquired by a scanner unit, wherein the point cloud data related to the measurement object is acquired by the scanner unit, which is integrally provided with a collimating ranging unit, the collimating ranging unit configured to irradiate the measurement object with first ranging light by collimation of a telescope portion and which, based on first reflected ranging light that is reflection of the first ranging light by the measurement object, measures a distance to the measurement object and detects a direction of the collimation, wherein the scanner unit is configured to rotatingly emit second ranging light and which, based on second reflected ranging light that is reflection of the second ranging light by the measurement object, measures a distance to the measurement object and detects an emission direction of the second ranging light to acquire point cloud data related to the measurement object; and acquiring, based on a survey result of the collimating ranging unit, three-dimensional data related to the characteristic portion, adding the three-dimensional data related to the characteristic portion having been acquired based on the survey result of the collimating ranging unit to the point cloud data, automatically setting a region including the recognized characteristic portion at a measurement location, and acquiring the three-dimensional data related to the characteristic portion by having the collimating ranging unit execute an automatic scan at the measurement location, and when a difference between distance data among the first piece of three-dimensional data and distance data among the second piece of three-dimensional data in the region is equal to or greater than a predetermined value, recognizing that the characteristic portion is a corner portion or an edge portion of the measurement object.

* * * * *